UNITED STATES PATENT OFFICE.

CAMP L. POYNOR, OF NORTH FORT WORTH, TEXAS.

FERTILIZER AND METHOD OF PRODUCING THE SAME.

1,398,113. Specification of Letters Patent. Patented Nov. 22, 1921.

No Drawing. Application filed January 7, 1921. Serial No. 435,692.

*To all whom it may concern:*

Be it known that I, CAMP L. POYNOR, a citizen of the United States of America, residing at North Fort Worth, in the county of Tarrant and State of Texas, have invented new and useful Improvements in Fertilizers and Methods of Producing the Same, of which the following is a specification.

The object of the invention is to provide a fertilizing material which may be preserved in a substantially stable condition for an indefinite length of time so as to adapt it for transportation and storage without appreciable deterioration and in a relatively condensed or concentrated form as a means of minimizing bulk and weight and therefore economizing in storage and transportation costs, and which when placed in the soil will not be subject to the dissipation by evaporation and otherwise of its essential properties necessary to the stimulation of the vegetable growth for which it is designed, and to which dissipation the ordinary forms of fertilizer are admittedly subject, to the extent that only a very small proportion of the inherent fertilizing effect thereof can be realized in the actual use thereof.

It has been determined by experiment and analysis that fertilizing material prepared in the ordinary way as when subjected to any considerable degree of temperature, or when cooked, or exposed during certain stages of its development to atmospheric conditions as to air, temperature and moisture, is of a relatively unstable quality, and when placed in the soil the result is a rapid dissipation of certain of its qualities and properties, due to evaporation or to absorption by the soil, or both, without appreciable or beneficial effect upon the growing plants for whose benefit the fertilizer is employed. Therefore it is the object of this invention to provide a method of preparing a fertilizing material in which all of the characteristics necessary to insure stability prior to actual use and stability and efficiency when introduced into the soil may be insured, and whereby the objectionable dissipation of the essential properties of the fertilizer may be prevented, and the effect thereof concentrated upon the growth for the advancement of which the material is used.

With these objects in view the invention consists in a procedure and combination of elements of which the following is a description.

The qualities or characteristics which are lacking in fertilizer of the commercial or commonly used forms are to be found in fresh green vegetable growth or young plants having their first green color, and the procedure which has been found to stabilize these qualities or characteristics consists in baling such green vegetable growth and subjecting it for a relatively protracted period, as for example for ninety days to a substantially uniform temperature under conditions excluding light and air, as for example by placing the same in a covered trench formed in the ground and covered by soil with, however, the soil kept out of contact with the plants as by supporting the bales on a platform or floor in the trench and covering the latter with boards or planks in turn covered by earth.

After the completion of this step in the process the bales may be removed to a storage warehouse or barn and permitted to dry thoroughly without exposure to excessive heat but under normal atmospheric conditions protected from moisture.

The dried material is then pulverized and thereafter saturated and thoroughly impregnated with a soured or fermented solution of overripe fruit or vegetable substances to which may be added a certain percentage of commercial fertilizer if the characteristics of lime, phosphorus and the like are desired in the final product, and after such saturation the bales are permitted to dry in the atmosphere and may then be stored for subsequent use whenever required.

The soured solution may be prepared by placing a quantity for example of thoroughly ripe watermelons in a more or less crushed or mutilated condition in a vat with water to which may be added a quantity of commercial fertilizer such as that designated as packing house fertilizer consisting of stock yard or animal manure combined with ground bones and waste fertilizing phosphates, lime and the like, the quality of such commercial fertilizer for example being in about the proportion of three hundred pounds thereof to a thousand pounds of the dried green vegetable growth, the saturation or impregnation of the dried vegetable growth occurring after the mixture of ripe fruit or vegetable material and water with the commercial fertilizer has been allowed to stand a sufficient length of time to sour or begin to ferment.

It has been found in practice that a fertilizing material prepared as indicated can be preserved indefinitely and will act with marked results upon vegetation in connection with which it may be employed.

The invention having been described, what is claimed as new and useful is:—

1. A fertilizing material consisting of dried green vegetable growth in combination with a product having the characteristics of lime and phosphorus.

2. A fertilizer consisting of dried green vegetable growth, a product having the characteristics of lime and phosphorus, and a soured solution of fruit and vegetable products with which the aforesaid are impregnated.

3. A fertilizer consisting of dried fresh vegetable growth impregnated with a soured solution of fruit or vegetable products.

4. The method of producing a fertilizer which consists in drying fresh green vegetable growth, saturating the same with a soured solution of fruit and vegetable products and finally drying the same.

5. The method of producing a fertilizer which consists in covering fresh green vegetable growth with a layer of earth to maintain a constant temperature for a protracted period, then drying in exposure to the air, then saturating the dried material with a soured solution of fruit and vegetable products and commercial fertilizing materials, and finally drying.

6. The method of producing a fertilizer which consists in baling fresh green vegetable growth and covering the same with a layer of earth to maintain a constant temperature for a protracted period, then drying in exposure to the air, then saturating the dried material in a soured solution of fruit and vegetable products combined with commercial fertilizing materials, and finally drying.

7. The method of producing a fertilizer which consists in bailing fresh green vegetable growth and covering the same with a layer of earth to maintain a constant temperature for a protracted period, then saturating the dried material with a soured solution of ripe fruit products and commercial fertilizing materials including mineral products and finally drying.

In testimony whereof I affix my signature.

CAMP L. POYNOR.